2 Sheets—Sheet 1.

M. G. GRAHAM.
Cultivator.

No. 199,701. Patented Jan. 29, 1878.

Witnesses:
D. J. Stuart
A. McCallum

Inventor:
Muckersie G. Graham,
By W. B. Richards,
Atty.

2 Sheets—Sheet 2.

M. G. GRAHAM.
Cultivator.

No. 199,701. Patented Jan. 29, 1878.

Witnesses:
D. Y. Stuart
A. M. Callum

Inventor:
Muckersie G. Graham,
By W. B. Richards,
Atty.

UNITED STATES PATENT OFFICE.

MUCKERSIE G. GRAHAM, OF MONMOUTH, ILLINOIS.

IMPROVEMENT IN CULTIVATORS.

Specification forming part of Letters Patent No. 199,701, dated January 29, 1878; application filed October 15, 1877.

*To all whom it may concern:*

Be it known that I, MUCKERSIE G. GRAHAM, of Monmouth, in the county of Warren and State of Illinois, have invented certain new and useful Improvements in Cultivators; and I do hereby declare that the following is a full, clear, and exact description of my invention, which will enable others skilled in the art to which it appertains to make and use the same, reference being had to the accompanying drawings, and to letters of reference marked thereon, which form a part of this specification.

Figure 1:
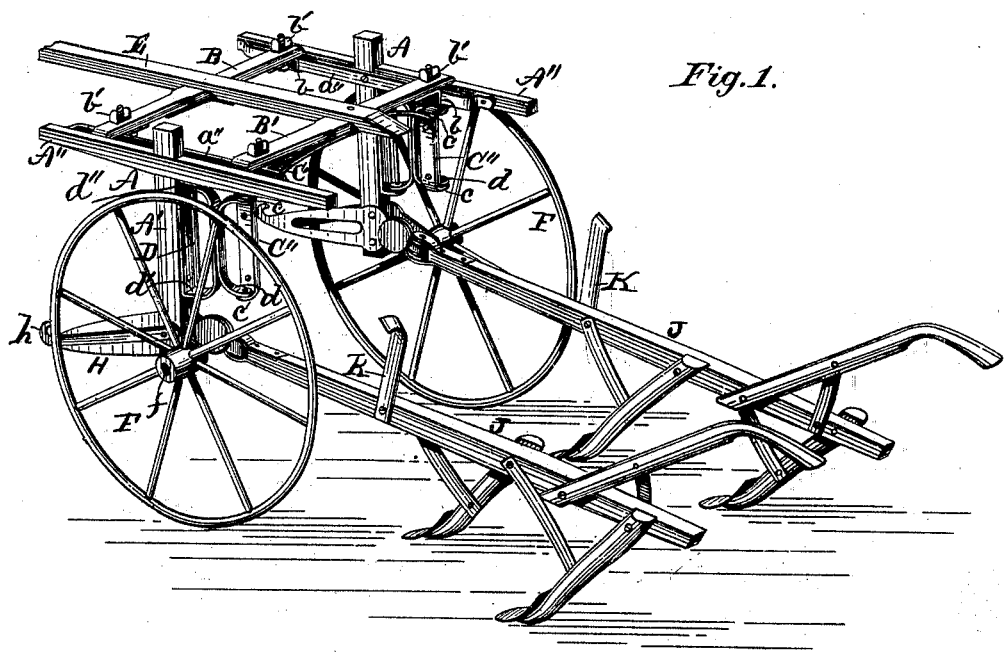
Figure 4:
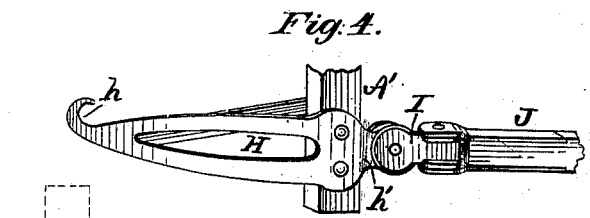
Figure 5:
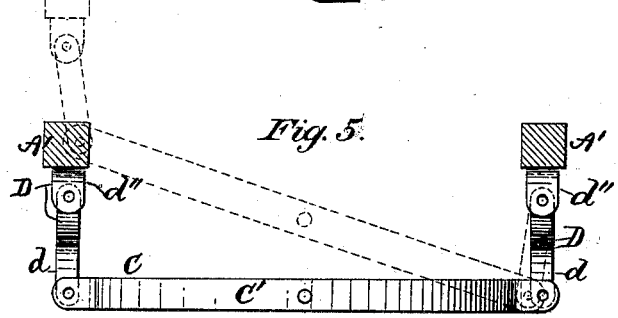
Figure 2:
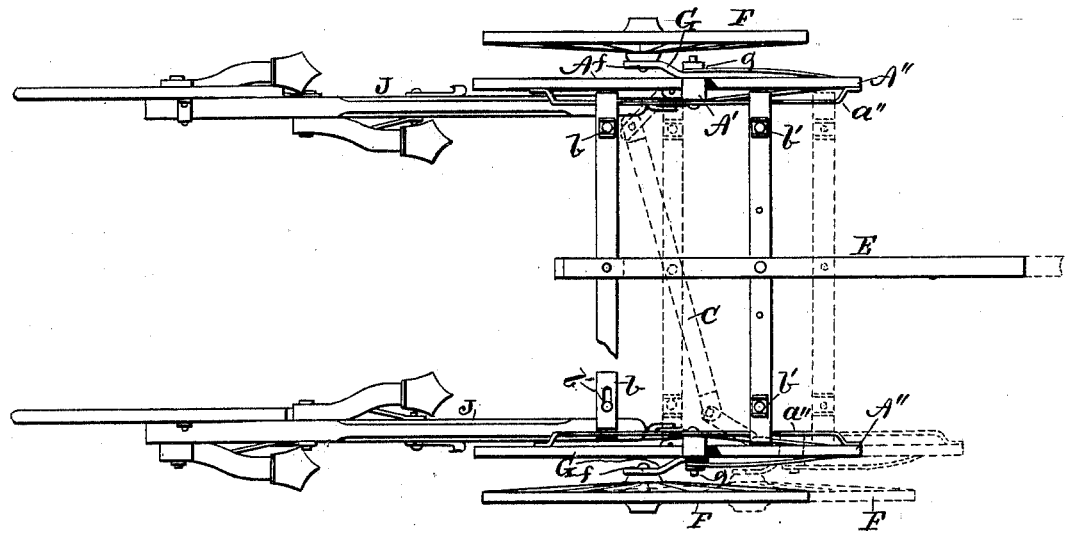
Figure 3:
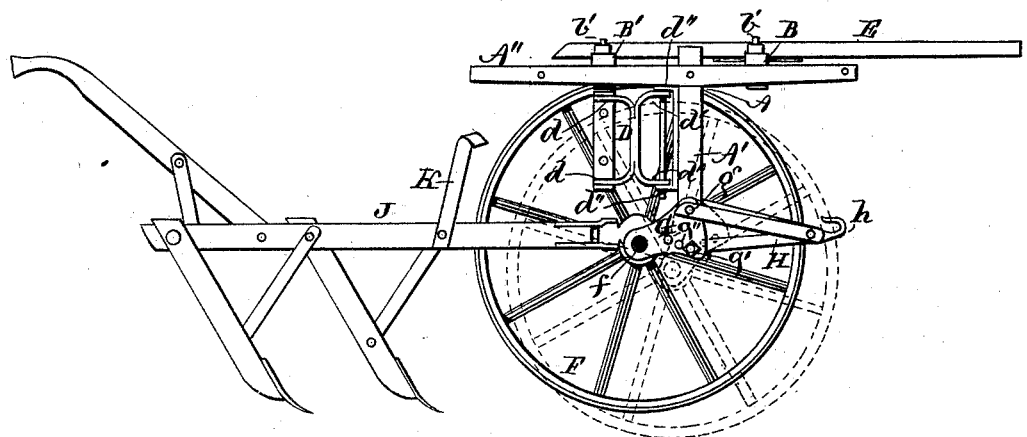

Figure 1 is a perspective view of a cultivator embodying my invention. Fig. 2 is a top-plan view. Fig. 3 is a side elevation. Fig. 4 is an enlarged perspective view of one of the draft-plates and its connections. Fig. 5 is an enlarged top-plan view of the double-hinged yoke and its connections.

This invention relates to that class of cultivators known as "parallel-motion cultivators;" and the invention consists, first, in connecting the two side frames which support the wheels by means of a bar or bars having a sliding connection with said side frames, by means of which a uniform distance may be preserved between the side frames while they are advanced or receded relatively to each other; second, the combination of a guide pole or tongue with said connecting bar or bars for holding them in proper position; third, the use of a yoke for connecting the side frames and sustaining them against lateral deflection, hinged to said side frames by double hinges, which permit of either side frame being advanced or receded relatively to its fellow side frame, while they are held at uniform distances apart in their different relative positions by the sliding bars hereinbefore referred to; fourth, in making the sliding bars adjustable in length, in combination with the double-hinged yoke and side frames; fifth, in the peculiar manner of hinging the wheel-spindle plates to the side frames for raising and lowering the frame; sixth, in the use of draft-plates having extended rear ends, to which the plow-beams are attached.

The invention further relates to details of construction and arrangement hereinafter fully set forth.

Referring to the drawings by letters, A A represent the side frames, formed of standards A', having bars A'' secured to their upper ends, and connected by transverse bars B B', having loops or stirrups $b$ on their ends, which encircle bars $a''$ attached to the bars A''; or they may encircle the bars A'' themselves. The loops $b$ are made adjustable on the bars B B' by means of bolts $b'$ and a series of holes in the extended ends of said loops. C is a yoke, its central part C' curved upward, and its vertical ends C'' having lugs $c\ c$ fixed thereon. D D are plates, each having two arms, $d$, hinged or pivoted to the lugs $c\ c$ on one end of the yoke C, and two arms, $d'$, hinged to lugs $d''$, which project from the standards A'. The plates D, hinged to the ends of the yoke C, constitute therewith an extensile and contractile yoke, connecting the standards A', and sustaining them in parallel upright positions. E is the tongue or draft-pole, bolted rigidly to the bars B B' and the central upper part of the yoke C. F F are the supporting-wheels, journaled on spindles $f$, which project from plates G. The plates G are pivoted at one end by a bolt, $g$, to the standards A', and by means of another bolt, $g'$, and a series of holes, $g''$, in the plate G, said plate may be adjusted at different angles to the bars A'.

H H are draft-plates bolted to the standards A', and, projecting forward, have their front ends formed into hooks $h$, to attach the draft-animals, and their rear ends $h'$, extended rearward of the bars A', have the forward ends of coupling-plates I journaled thereto, so that each plate I may be oscillated in a vertical plane. J J are ordinary cultivator-plows, hinged to the rear ends of the plates I, so as to permit of lateral oscillation or movement of the plows. Each plow-beam is provided with a hook-rod, K, which may be engaged with the extended rear end of a bar, A'', for the purpose of suspending the plows above the ground for local transportation or other purposes.

The distance between the side frames, between the wheels, and between the plows may be adjusted by means of adjusting the loops $b$ on the bars B B'.

In operation each draft-animal draws its attached plow, and either animal advancing or receding in relation to its fellow animal will advance or recede its respective plow, while the side frames, wheels, and plows are held at uniform distances apart laterally by means of the bars B, which are held at right angles to the line of progression of the machine by the guide-pole, and permit either bar $a''$ to slide freely through the loops $b$ and advance or recede either side frame without disturbing its vertical position or changing the horizontal position of the bar or bars B. As either side of the machine is advanced or receded the distance between the standards A', measured obliquely to the line of progression, will be increased, as shown by dotted lines at Fig. 2, and the yoke C, being extensible, will adapt itself to the increased distance, and, being contractile, will as readily adapt itself to the diminished distance arising as the standards A' approach positions at right angles to the line of progression. The wheels F are held parallel with the line of progression and with the tongue E by the bars B B' and yoke C, and it will be seen that the rear bar B' may be removed without materially affecting or changing the operations of the machine.

The depth of plowing may be adjusted by adjusting the angle of the plates G to the standards A' by means of the bolts $g$, as shown by dotted lines at Fig. 3.

The length of the bars $a''$ from the standards A' can be adjusted to limit the distance that either draft-animal may advance and only draw its own side of the machine.

What I claim as new, and desire to secure by Letters Patent, is—

1. In a cultivator, the side frames to which the plows are hinged or journaled, combined with one or more bars, B, having guides, by which they are connected with the side frames, and whereby the said side frames may be slid or reciprocated upon the bar or bars B, to advance or recede either of the side frames while they are held at uniform distances apart and the bar or bars B remain at right angles to the line of progression of the machine and in a horizontal position, substantially as specified.

2. The guide pole or tongue E, bolted to the bar B and arranged to operate with the sliding frames A, plows J J, and wheels F, without interfering with the sliding or parallel motion of the frames, substantially as and for the purpose specified.

3. The extensile and contractile yoke C D, arranged to operate with the standards A', to which the cultivator-plows J are attached, substantially as and for the purpose specified.

4. In combination with an extensible yoke C D and bar B, to which the tongue E is bolted, frames A, having plows J and wheels F attached thereto, and arranged to operate substantially as described, and for the purpose specified.

5. The bar or bars B, combined with the bars $a''$, on which they slide, and with the standards A', plows J, and wheels F, substantially as described, and for the purpose specified.

6. The bars B B', having adjustable loops $b$ on their ends, combined with the frames A, plows J, and wheels F, substantially as and for the purpose specified.

7. The draft-plates H, rigidly attached to the standards A', and having extended rear ends $h'$, to which the plows J are connected, combined with the sliding frames A, wheels F, bars B, and tongue E, substantially as described, and for the purpose specified.

In testimony that I claim the foregoing as my own I affix my signature in presence of two witnesses.

MUCKERSIE G. GRAHAM.

Witnesses:
EDWARD L. FIELD,
P. R. RICHARDS.